United States Patent
Zou et al.

(10) Patent No.: US 10,852,521 B2
(45) Date of Patent: Dec. 1, 2020

(54) REAL-TIME FOCUSING IN LINE SCAN IMAGING

(71) Applicant: LEICA BIOSYSTEMS IMAGING, INC., Vista, CA (US)

(72) Inventors: Yunlu Zou, San Diego, CA (US); Gregory Crandall, San Marcos, CA (US); Allen Olson, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 0 days.

(21) Appl. No.: 16/224,397

(22) Filed: Dec. 18, 2018

(65) Prior Publication Data
US 2019/0121108 A1    Apr. 25, 2019

Related U.S. Application Data

(63) Continuation of application No. 15/838,043, filed on Dec. 11, 2017, now Pat. No. 10,191,264, which is a
(Continued)

(51) Int. Cl.
| | | |
|---|---|---|
| *G02B 21/00* | (2006.01) | |
| *G02B 21/24* | (2006.01) | |
| *G02B 21/36* | (2006.01) | |

(52) U.S. Cl.
CPC ......... *G02B 21/006* (2013.01); *G02B 21/245* (2013.01); *G02B 21/361* (2013.01); *G02B 21/365* (2013.01)

(58) Field of Classification Search
None
See application file for complete search history.

(56) References Cited

U.S. PATENT DOCUMENTS

| | | | |
|---|---|---|---|
| 3,967,110 A | | 6/1976 | Rogers et al. |
| 4,636,627 A | * | 1/1987 | Matsumura ............ G02B 7/343 |
| | | | 250/201.8 |

(Continued)

FOREIGN PATENT DOCUMENTS

| | | |
|---|---|---|
| CN | 101558430 A | 10/2009 |
| DE | 10127284 A1 | 12/2002 |

(Continued)

OTHER PUBLICATIONS

Wayback Machine web archive from Mar. 23, 2012 of The Free Dictionary retrieved from https://www.thefreedictionary.com/optical+prism on Dec. 19, 2019 (Year: 2012).*

(Continued)

*Primary Examiner* — Lindsay J Uhl
(74) *Attorney, Agent, or Firm* — Procopio; Pattric J. Rawlins; Jonathan D. Cheng

(57) ABSTRACT

Systems and methods for capturing a digital image of a slide using an imaging line sensor and a focusing line sensor. In an embodiment, a beam-splitter is optically coupled to an objective lens and configured to receive one or more images of a portion of a sample through the objective lens. The beam-splitter simultaneously provides a first portion of the one or more images to the focusing sensor and a second portion of the one or more images to the imaging sensor. A processor controls the stage and/or objective lens such that each portion of the one or more images is received by the focusing sensor prior to it being received by the imaging sensor. In this manner, a focus of the objective lens can be controlled using data received from the focusing sensor prior to capturing an image of a portion of the sample using the imaging sensor.

6 Claims, 8 Drawing Sheets imaging during scan

Related U.S. Application Data continuation of application No. 14/398,443, filed as application No. PCT/US2013/031045 on Mar. 13, 2013, now Pat. No. 9,841,590.

(60) Provisional application No. 61/641,788, filed on May 2, 2012.

(56) References Cited

U.S. PATENT DOCUMENTS

| | | |
|---|---|---|
| 5,756,307 A | 5/1998 | Uhl et al. |
| 6,091,075 A | 7/2000 | Shibata et al. |
| 6,640,014 B1 | 10/2003 | Price et al. |
| 6,724,489 B2 | 4/2004 | Freifeld |
| 6,760,154 B1 | 7/2004 | Focht |
| 6,825,454 B2 | 11/2004 | Czarnetzki et al. |
| 7,071,451 B2 | 7/2006 | Ishikawa et al. |
| 7,232,980 B2 | 6/2007 | Oshiro et al. |
| 7,330,574 B2 | 2/2008 | Olszak |
| 7,576,307 B2 | 8/2009 | Yazdanfar et al. |
| 7,719,598 B2 | 5/2010 | Ortyn et al. |
| 7,813,579 B2 | 10/2010 | Oshiro et al. |
| 7,889,263 B2 | 2/2011 | Ortyn et al. |
| 8,027,548 B2 | 9/2011 | Oshiro et al. |
| 8,175,452 B1 | 5/2012 | Staker et al. |
| 8,184,920 B2 | 5/2012 | Oshiro et al. |
| 8,304,704 B2 | 11/2012 | Hing et al. |
| 8,379,136 B2 | 2/2013 | Ortyn et al. |
| 8,428,454 B2 | 4/2013 | Staker et al. |
| 8,878,923 B2 | 11/2014 | Henderson et al. |
| 9,036,255 B2 | 5/2015 | Loney et al. |
| 9,113,091 B2 | 8/2015 | Bishop et al. |
| 9,116,035 B2 | 8/2015 | Gouch et al. |
| 9,229,211 B2 | 1/2016 | Yamamoto |
| 9,841,590 B2 * | 12/2017 | Zou .................. G02B 21/006 |
| 2002/0044346 A1 | 4/2002 | Nguyen et al. |
| 2004/0129858 A1 | 7/2004 | Czarnetzki et al. |
| 2005/0089208 A1 * | 4/2005 | Dong .................. G02B 21/241 382/133 |
| 2005/0105174 A1 | 5/2005 | Ogihara et al. |
| 2005/0258335 A1 | 11/2005 | Oshiro et al. |
| 2005/0270611 A1 | 12/2005 | Oshiro et al. |
| 2006/0060781 A1 * | 3/2006 | Watanabe .............. B82Y 10/00 250/310 |
| 2007/0034773 A1 | 2/2007 | Amar et al. |
| 2007/0102620 A1 | 5/2007 | Bublitz et al. |
| 2007/0147673 A1 * | 6/2007 | Crandall .............. G02B 21/367 382/128 |
| 2007/0159687 A1 * | 7/2007 | Tohma ................. G02B 21/244 359/368 |
| 2008/0137938 A1 | 6/2008 | Zahniser |
| 2008/0266440 A1 | 10/2008 | Yazdanfar et al. |
| 2009/0295963 A1 | 12/2009 | Bamford et al. |
| 2012/0050562 A1 * | 3/2012 | Perwass ............... H04N 5/2254 348/222.1 |
| 2012/0287256 A1 | 11/2012 | Hulsken et al. |
| 2013/0057674 A1 | 3/2013 | Hulsken et al. |
| 2013/0093874 A1 | 4/2013 | Hulsken |
| 2014/0125776 A1 * | 5/2014 | Damaskinos ........ G02B 21/365 348/50 |
| 2014/0168640 A1 | 6/2014 | Gouch |
| 2014/0231638 A1 | 8/2014 | Damaskinos et al. |
| 2014/0267673 A1 | 9/2014 | Yamamoto et al. |
| 2015/0116475 A1 | 4/2015 | Oishi |
| 2015/0153555 A1 | 6/2015 | Loney et al. |
| 2015/0156396 A1 | 6/2015 | Oishi |
| 2015/0156397 A1 | 6/2015 | Oishi |
| 2015/0163394 A1 | 6/2015 | Tsai et al. |
| 2016/0142617 A1 | 5/2016 | Oishi et al. |
| 2016/0156832 A1 | 6/2016 | Oishi et al. |

FOREIGN PATENT DOCUMENTS

| | | |
|---|---|---|
| DE | 102007017598 A1 | 10/2008 |
| JP | H08320430 A | 12/1996 |
| JP | H09189850 A | 7/1997 |
| JP | 11052224 A | 2/1999 |
| JP | 2004046132 A | 2/2004 |
| JP | 2005070225 A | 3/2005 |
| JP | 2007327891 A | 12/2007 |
| JP | 2015523587 A | 8/2015 |
| WO | 2004097493 A1 | 11/2004 |
| WO | 2005114287 A1 | 1/2005 |
| WO | 2005010495 A2 | 2/2005 |
| WO | 2010067256 A1 | 6/2010 |
| WO | 2011145016 A1 | 11/2011 |
| WO | 2011161594 A1 | 12/2011 |
| WO | 2013017855 A1 | 2/2013 |
| WO | 2013040686 A1 | 3/2013 |
| WO | 2013165576 A1 | 11/2013 |
| WO | 2014174919 A1 | 10/2014 |
| WO | 2014199685 A1 | 12/2014 |

OTHER PUBLICATIONS

Notice of Reasons for Rejection dated Mar. 7, 2017 and English translation for related Japanese Patent Application No. 2015-510265, in 6 pages.
Extended European Search Report dated Jan. 26, 2016 for related European Patent Application No. 13784683.8, in 12 pages.
International Search Report and Written Opinion for related International Application No. PCT/US2016/053581 dated Dec. 6, 2016, in 10 pages.
International Search Report dated Jun. 21, 2013 issued for International Application No. PCT/US2013/031045.
U.S. Appl. No. 15/838,043, filed Dec. 11, 2017, U.S. Pat. No. 10,191,264.
U.S. Appl. No. 14/398,443, filed Oct. 31, 2014, U.S. Pat. No. 9,841,590.
Communication pursuant to Rule 164(1) EPC dated Apr. 17, 2019 for related European Patent Application No. 16849812.9, in 15 pages.
Communication pursuant to Article 94(3) EPC dated Jul. 19, 2019 for related European Patent Application No. 13784683.8, in 5 pages.
Extended European Search Report dated Sep. 3, 2019 for related European Patent Application No. 16849812.9, in 15 pages.
Office Action dated Feb. 3, 2020 for related Chinese Patent Application No. 201680055451.2 and its corresponding machine English translation, in 29 pages.
Communication pursuant to Article 94(3) EPC dated May 12, 2020 for related European Patent Application No. 13784683.8, in 5 pages.
Preliminary Office Action dated May 26, 2020 for related Brazilian Patent Application No. BR112018005822-0, in 5 pages.
Notice of Reasons for Refusal dated Jun. 18, 2020 for related Japanese Patent Application No. 2018-515597 and its corresponding English translation, in 10 pages.

* cited by examiner

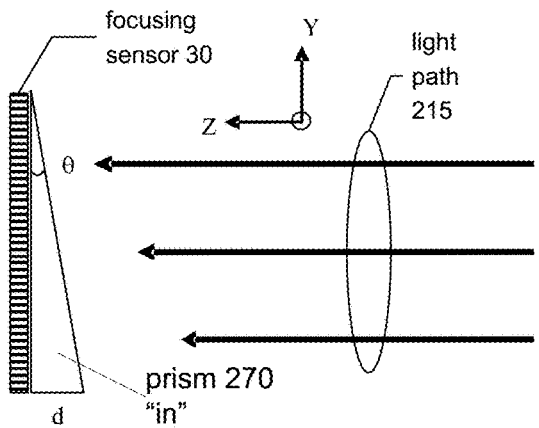
FIG. 7A focusing during stage retrace
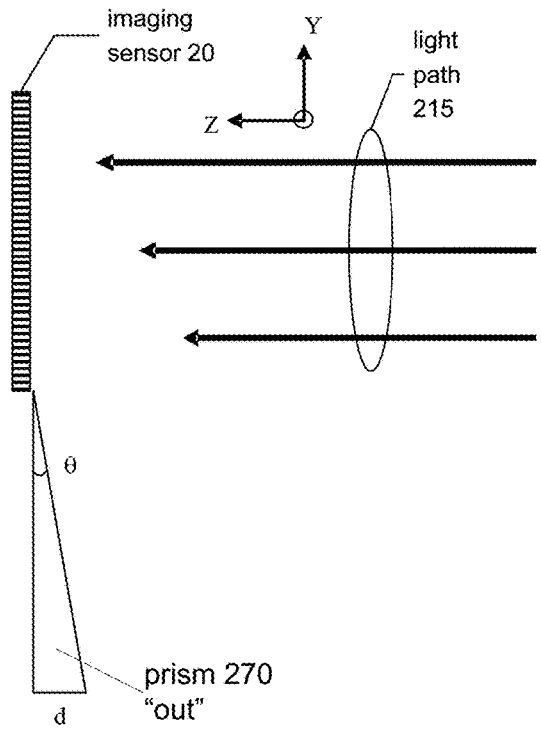
FIG. 7B imaging during scan
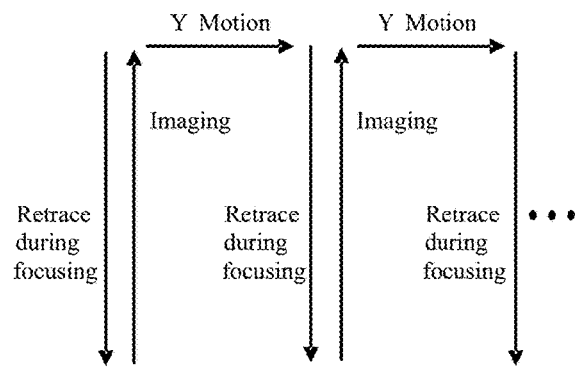
FIG. 9
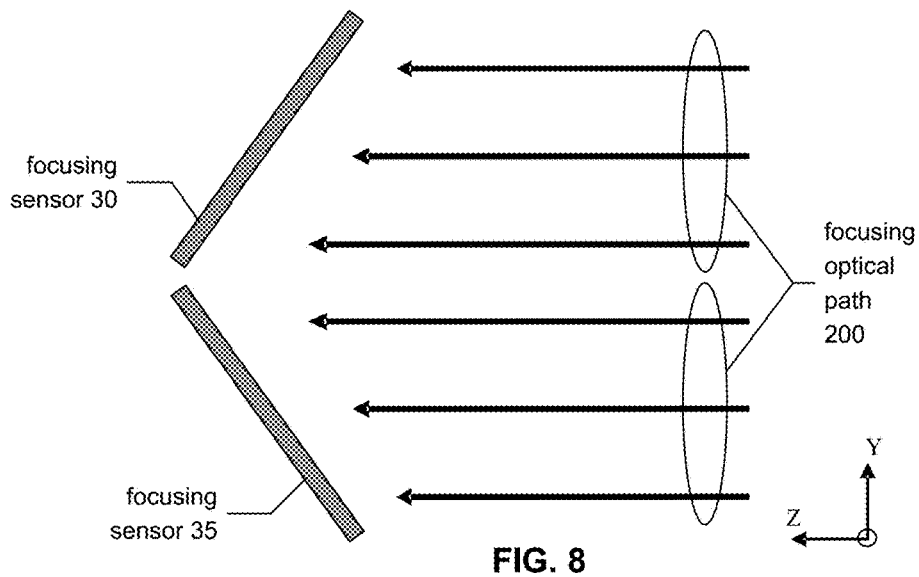
FIG. 8

REAL-TIME FOCUSING IN LINE SCAN IMAGING

CROSS REFERENCE TO RELATED APPLICATIONS

The present application is a continuation of U.S. patent application Ser. No. 15/838,043, filed on Dec. 11, 2017, which is a continuation of U.S. patent application Ser. No. 14/398,443, filed on Oct. 31, 2014, which is a national stage entry of International Patent App. No. PCT/US2013/031045, filed on Mar. 13, 2013, which claims priority to U.S. Provisional App. No. 61/641,788, filed on May 2, 2012, the disclosures of all of which are hereby incorporated herein by reference as if set forth in their entireties.

BACKGROUND

Field of the Invention

The present invention generally relates to digital pathology and more particularly relates to a multiple independent linear sensor apparatus for performing real-time focusing in line scan imaging.

Related Art

Most auto-focus methods in microscopic imaging systems can be divided into two categories: laser-based interferometer for sensing slide position and image content analysis. The image content analysis methods require multiple image acquisitions at different focus depths and use algorithms to compare the images to determine the best focus. Acquiring the multiple images may create time delays between focusing and imaging. Measuring the reflection of the laser beam off a slide surface can provide only global focus information of the slide or the cover slip position. It lacks focusing accuracy to tissues with large height variations.

Therefore, what is needed is a system and method that overcomes these significant problems found in the conventional systems as described above.

SUMMARY

In an embodiment, the present invention is based on image content analysis (e.g., tissue finding and macro focus), and takes advantage of line imaging and line focusing for accurate real-time auto-focusing, without having to take multiple images for focusing which would introduce a time delay during scanning. In one embodiment, full stripe focusing is performed during a retrace process of line scanning. In an alternative embodiment, focusing is performed during image scanning. Both embodiments eliminate time delays in image scanning, thus speeding up the entire digital image scanning process.

In an embodiment, a system for capturing a digital image of a slide is disclosed. The system comprises an objective lens having a single optical axis; a motorized positioner to control the objective lens; a stage configured to support a sample; at least one imaging sensor; at least one focusing sensor; at least one beam-splitter optically coupled to the objective lens and configured to receive one or more images of at least a portion of the sample through the objective lens, and simultaneously provide a first portion of the one or more images to the at least one focusing sensor and a second portion of the one or more images to the at least one imaging sensor; and at least one processor that controls one or more of the stage and the objective lens such that each portion of the one or more images is received by the at least one focusing sensor prior to it being received by the at least one imaging sensor.

In a further embodiment, a method for capturing a digital image of a slide is disclosed. The method comprises, by an objective lens having a single optical axis, acquiring one or more images of at least a portion of a sample supported on a stage; by at least one beam-splitter optically coupled to the objective lens, simultaneously providing a first portion of the one or more images to at least one focusing sensor and a second portion of the one or more images to at least one imaging sensor; and by at least one processor, controlling one or more of the stage and the objective lens such that each portion of the one or more images is received by the at least one focusing sensor prior to it being received by the at least one imaging sensor.

In an additional embodiment, a system for capturing a digital image of a slide is disclosed. The system comprises an objective lens; a stage configured to support a sample; at least one imaging sensor comprising a linear array and a wedge prism, the linear array configured to receive a light path via the objective lens; at least one processor that controls the wedge prism by moving the wedge prism into the light path during a retrace operation and moving the wedge prism out of the light path during a scan operation, receives digital image data from a retrace operation of at least a portion of the sample, determines a focus height based on the digital image data, and adjusts the height of the objective lens to the focus height prior to a scan operation of the at least a portion of the sample.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIGS. 7A and 7B are block diagrams illustrating an example dual imaging and focusing sensor with a moveable prism, according to an embodiment;

FIG. 8 is a block diagram illustrating an example multiple focusing sensor configuration of a scanning system, according to an embodiment;

FIG. 9 is a block diagram illustrating an example slide motion of a scanning system, according to an embodiment;

DETAILED DESCRIPTION

Certain embodiments disclosed herein provide for real-time (i.e., instantaneous or near-instantaneous) focusing in line scan imaging using multiple linear detectors or other components. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
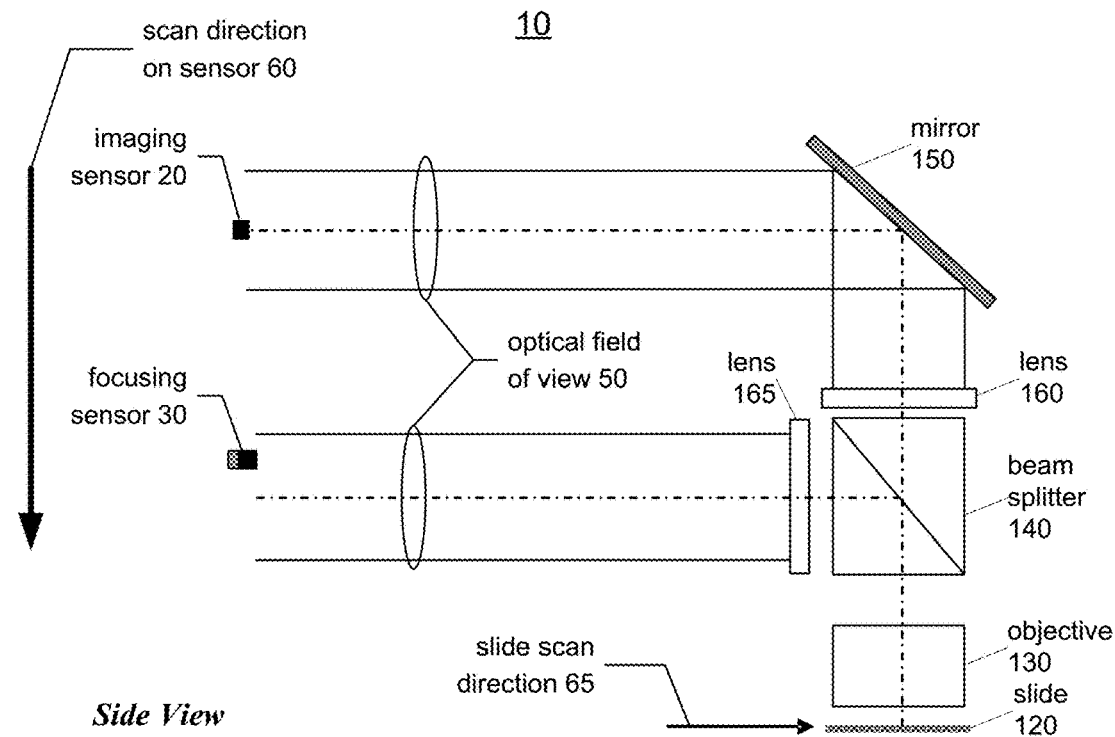
FIG. 1 is a block diagram illustrating an example side view configuration of a scanning system, according to an embodiment.

FIG. 1 is a block diagram illustrating an example side view configuration of a scanning system 10, according to an embodiment. In the illustrated embodiment, the scanning system 10 comprises a tissue slide 120 that is placed on a motorized stage (not shown) and illuminated by an illumination system (not shown) and moved in a scanning direction 65. An objective lens 130 has an optical field of view that is trained on the slide 120 and provides an optical path for light from the illumination system that passes through the specimen on the slide or reflects off of the specimen on the slide or fluoresces from the specimen on the slide or otherwise passes through the objective lens 130. The light travels on the optical path to a beam splitter 140 that allows some of the light to pass through lens 160 to an imaging sensor 20. The light may optionally be bent by a mirror 150 as shown in the illustrated embodiment. The imaging sensor 20 may be, for example, a line charge-coupled device (CCD).

Other of the light travels from the beam splitter 140 through lens 165 to a focusing sensor 30. The focusing sensor 30 may also be, for example, a line charge-coupled device (CCD). The light that travels to the imaging sensor 20 and the focusing sensor 30 preferably represents the complete optical field of view from the object lens 130. Based on the configuration of the system, the scanning direction 65 of the slide 120 is logically oriented with respect to the imaging sensor 20 and the focusing sensor 30 so that the logical scanning direction 60 causes the optical field of view of the objective lens 130 to pass over the respective imaging sensor 20 and focusing sensor 20.

As shown in the illustrated embodiment, the imaging sensor 20 is centered within the optical field of view of the objective lens 130 while the focusing sensor 30 is shifted away from the center of the optical field of view of the objective lens 130. The direction in which the focusing sensor 30 is shifted away from the center of the optical field of view of the objective lens 130 is the opposite of the logical scanning direction 60. This placement logically orients the focusing sensor 30 in front of the imaging sensor 20 such that as a specimen on a slide is scanned, the focusing sensor 30 "sees" the image data before the imaging sensor 20 "sees" that same image data. Finally, the focusing sensor 30 is tilted within the optical field of view such that light from the objective is sensed by the focusing sensor 30 at a plurality of Z values.

Figure 2:
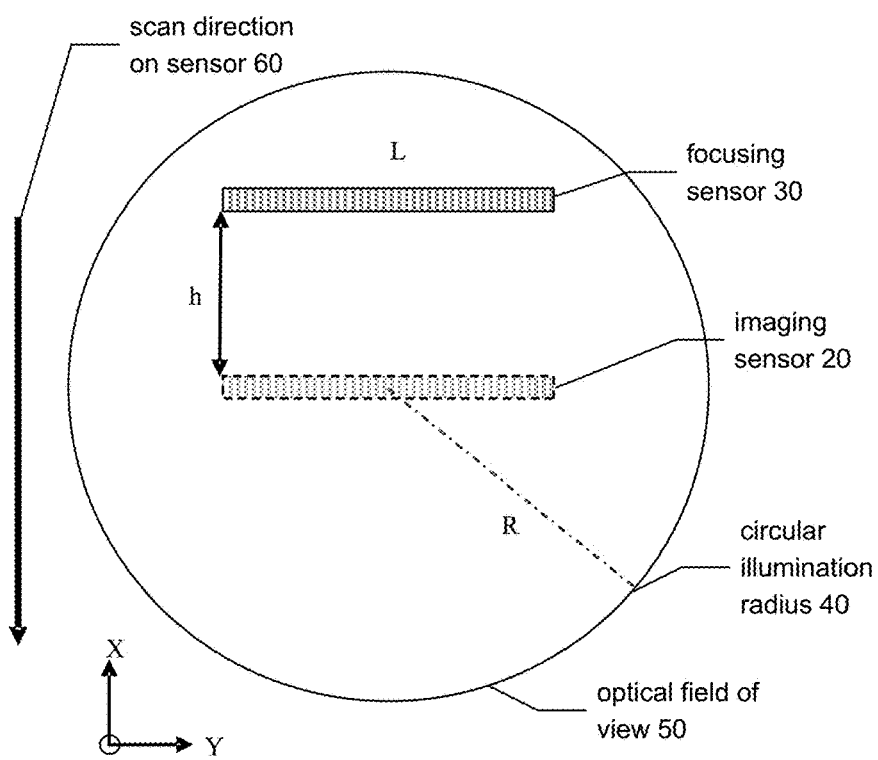
FIG. 2 is a block diagram illustrating an example configuration of a focusing sensor and imaging sensor with respect to a radius of illumination and a circular optical field of view, according to an embodiment.

FIG. 2 is a block diagram illustrating an example configuration of a focusing sensor 30 and imaging sensor 20 with respect to a circular illumination radius 40 and an optical field of view 50, according to an embodiment. In the illustrated embodiment, the positioning of the focusing sensor 30 is shown with respect to the imaging sensor 20 and the logical scan direction 60. The scan direction 60 in this case, refers to the direction in which the stage or specimen (e.g., a tissue sample) is moving with respect to the sensors 20 and 30 in space. As illustrated, the sample will reach the focusing sensor 30 first, and the imaging sensor 20 second. When the imaging sensor 20 and the focusing sensor 30 are projected onto a same plane using, for example a beamsplitter, the focusing sensor 30 is within the illumination circle, which has a radius R, of the optical field of view 50 at a location ahead of the primary imaging sensor 20 in terms of the logical scanning direction 60. Thus, when a section of a tissue sample passes the focusing sensor 30, focus data can be captured and the focus height calculated based on one or more predetermined algorithms. The focus data and focus height can be used to control (e.g., by a controller) the distance between an objective lens height and the tissue sample before the same section of the tissue sample is sensed by the primary imaging sensor 20 via the same objective.

The circular illumination radius 40 preferably illuminates an optical field of view 50 (FOV) covering both the focusing sensor 30 and the imaging sensor 20. The radius R is a function of the FOV on the object or sample and the optical magnification of the focusing optical path $M_{focusing}$. The function can be expressed as:

$$2R = FOV * M_{focusing}$$

For $M_{focusing}=20$ and FOV=1.325 mm (e.g., Olympus PlanApo 20× objective), R=13.25 mm. The imaging sensor 20 is projected in the middle of the optical field of view 50 for best image quality, while the focusing sensor 30 is located off-center with respect to the optical field of view 50 by a distance h from the imaging sensor 20. There is a relationship among the distance h, the radius R, and the focusing sensor 30 length L, such that:

$$h \leq \text{square root}(R^2 - (L/2)^2)$$

for a sensor length=20.48 mm and R=13.25 mm, h≤8.4 mm.

The available time t for the focusing sensor 30 to capture multiple camera lines, for focus height calculation and for moving the objective to the right Z value height, is a function of the distance h between the focusing sensor 30 and the imaging sensor 20, magnification $M_{focusing}$, and scan speed v:

$$v * t = h / M_{focusing}$$

For a scan speed of 4.6 mm/s, the maximum time available is about 91.4 ms for $M_{focusing}=20$ and h=8.4 mm. The maximum number of camera lines captured by the focusing sensor 30, available for the focus calculation is:

$N = t*\kappa$, where $\kappa$ is the line rate of the focusing sensor 30.

For a camera line rate of 18.7 kHz, $N_{max}=1,709$ lines, where the objective stays at the same height. Otherwise, $N<N_{max}$ to allow the objective to move to the next focus height.

At a high level, a tissue sample is passed under an objective lens in an X direction. A portion of the tissue sample is illuminated to create an illuminated view in the Z direction of a portion of the sample. The illuminated view passes through the objective lens which is optically coupled to both the focusing sensor 30 and imaging sensor 20, for example, using a beam splitter. The focusing sensor 30 and imaging sensor 20 are positioned such that the focusing sensor 30 receives a portion or line of the view before the imaging sensor 20 receives the same portion or line. In other words, as the focusing sensor 30 is receiving a first line of image data, the imaging sensor 20 is simultaneously receiving a second line of image data which was previously received by the focusing sensor 30 and which is a distance $h/M_{focusing}$ on the sample from the first line of image data. It will take a time period $\Delta t$ for the imaging sensor 20 to receive the first line of image data after the focusing sensor 30 has received the first line of image data, where $\Delta t$ represents the time that it takes the sample to move a distance $h/M_{focusing}$ in the scan direction.

During that period $\Delta t$, a processor of the scanning system 10 calculates an optimal focus height in the Z direction for the first line of image data, and adjusts the objective lens to the calculated optimal focus height. For instance, in an embodiment, the focusing sensor 30 is separate from the imaging sensor 20 and is tilted at an angle θ with respect to a direction that is perpendicular to the optical imaging path. Thus, the focusing sensor 30 receives pixels of image data at a plurality of Z values. The processor may then determine which Z height value corresponds to the pixel(s) of image data having the best focus (e.g., having the highest contrast with respect to the other pixels). After the optimal Z height value is determined, the processor or other controller may move the objective lens in the Z direction to the determined optimal Z height value before or simultaneously with the imaging sensor receiving the first line of image data.

Figure 3A:
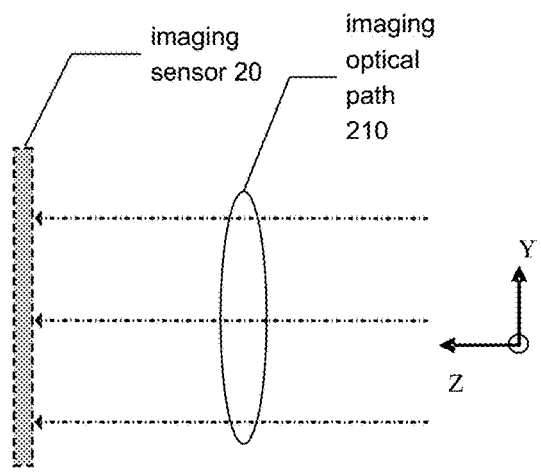
FIG. 3A is a block diagram illustrating an example top view configuration of a imaging sensor, according to an embodiment.
Figure 3B:
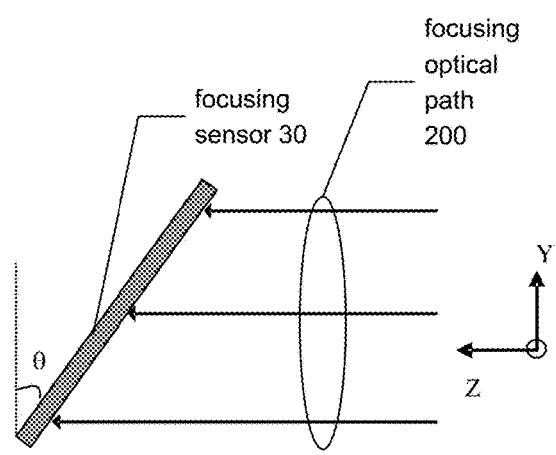
FIG. 3B is a block diagram illustrating an example top view configuration of a focusing sensor, according to an embodiment.

FIG. 3A is a block diagram illustrating an example top view configuration of a imaging sensor 20 with respect to an imaging optical path 210, according to an embodiment. Similarly, FIG. 3B is a block diagram illustrating an example top view configuration of a focusing sensor 30, with respect to a focusing optical path 200, according to an embodiment. As can be seen in FIG. 3B, the focusing sensor 30 is tilted at an angle θ with respect to a direction that is perpendicular to the focusing optical path 200.

Figure 4:
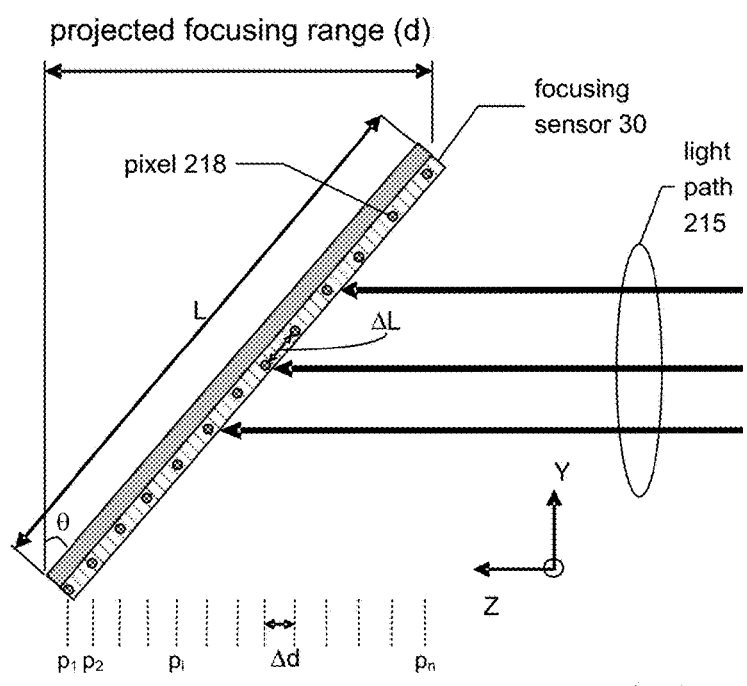
FIG. 4 is a block diagram illustrating an example focusing sensor, according to an embodiment.

FIG. 4 is a block diagram illustrating an example focusing sensor 30, according to an embodiment. In the illustrated embodiment, within a range of focusing (z) on a tissue sample (e.g., 20 μm), the focusing sensor 30 comprises a plurality of sensor pixels 218 and may be positioned at a location where the entire focusing range (z) in the Z direction is transferred by optics to the entire focusing sensor 30 array in the Y direction (orthogonal to the X direction, i.e., scan direction), as shown. The sensor pixel 218 location is directly correlated to the Z position of the objective at focus. As illustrated in FIG. 4, each dashed line, $p_1, p_2, \ldots p_i \ldots p_n$, across projected focusing range (d) represents a different focus value and corresponds to a focus height, i.e., Z height, of the objective lens. The $p_i$ having the optimal focus for a given portion of a sample can be used by the scanning system to determine the optimal focus height for that portion of the sample.

The relationship between the projected focusing range (d) on the focusing sensor 30 and the focusing range (z) on the specimen object is as follows:

$d = z*M_{focusing}^2$, where $M_{focusing}$ is the optical magnification of the focusing path. For instance, if $z=20$ μm and $M_{focusing}=20$, then $d=8$ mm.

In order to cover the entire projected focusing range (d) by a tilted focusing sensor 30 that is a linear array sensor, the tilting angle θ should follow the relationship:

$\sin θ = d/L$, where L is the length of the sensor 30.

Using $d=8$ mm and $L=20.48$ mm, $θ=23.0°$. θ and L can vary as long as the tilted sensor 30 covers the entire focusing range (z).

The focusing resolution, or the minimum step of objective height motion $\Delta z$ is a function of the sensor pixel size, $e = \text{minimum}(\Delta L)$. Derived from the above formulas:

$$\Delta z = e*z/L.$$

For instance, if $e=10$ μm, $L=20.48$ mm, and $z=20$ μm, then $\Delta z=0.0097$ μm $<10$ nm.

In an embodiment, one-dimensional data from the focusing sensor 30 is analyzed. A figure of merit (FOM) (e.g., contrast of the data) may be defined. The pixel 218 location (Z value) of the maximum FOM on the sensor array can be found. In this manner, the focus position (Z value) of the objective can be determined for that scan line on the sample.

The relationship between the objective height $Z_i$ and the focus location $L_i$ on the focusing sensor of focus point i is:

$$L_i = Z_i * M_{focusing}^2 / \sin θ$$

If the focus height is determined by a mean from $L_1$ to $L_2$, according to the analysis of the data from the focusing sensor 30 discussed above, the objective height needs to be moved from $Z_1$ to $Z_2$ based on:

$$Z_2 = Z_1 + (L_2 - L_1) * \sin θ / M_{focusing}^2$$

Although the field of view (FOV) in the Y axis of the focusing sensor 30 and the imaging sensor 20 can be different, the centers of both sensors are preferably aligned to each other along the Y axis.

Figure 5:
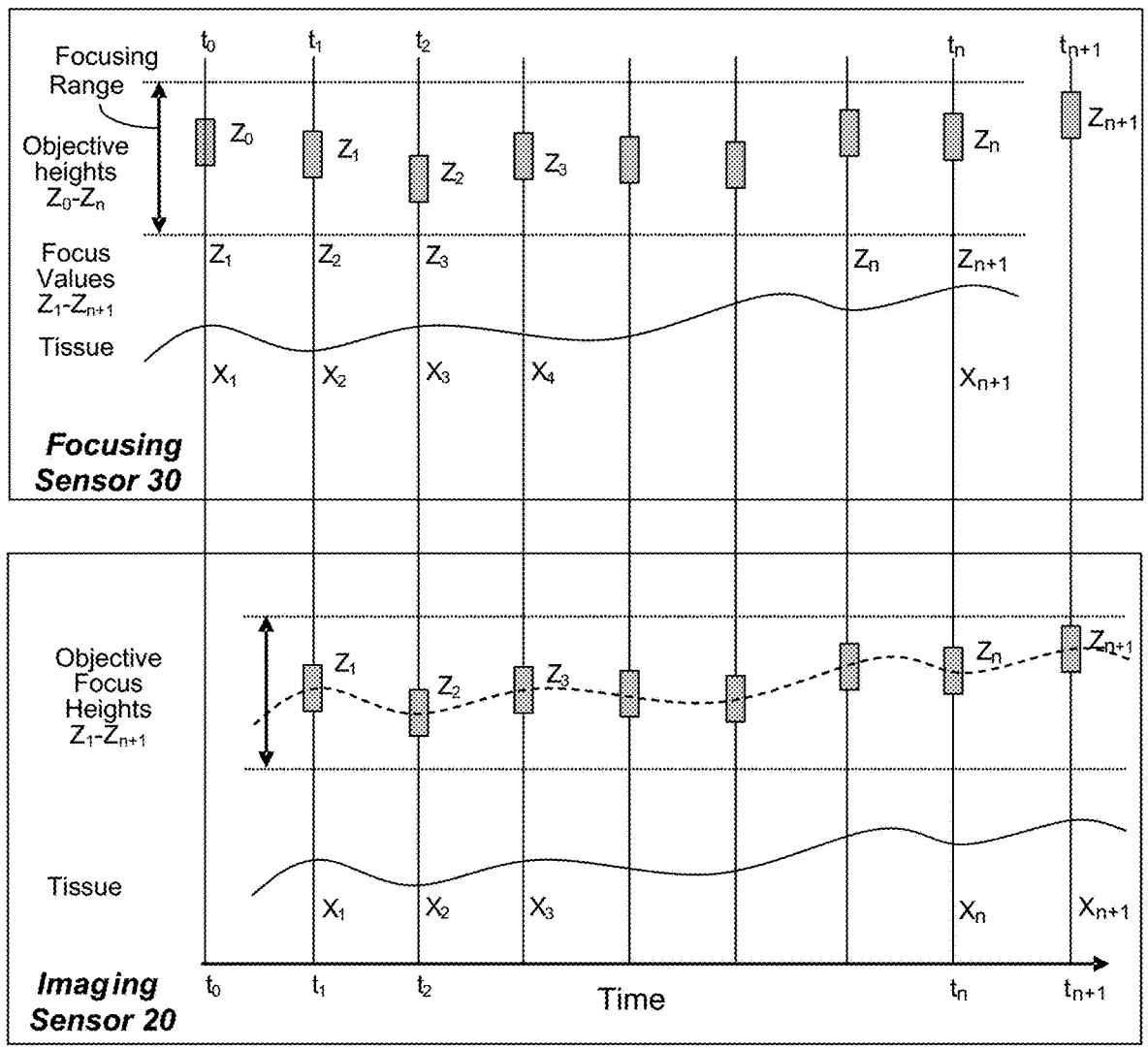
FIG. 5 is a time chart diagram illustrating an example interplay between a focusing sensor and an imaging sensor during scanning, according to an embodiment.

FIG. 5 is a time chart diagram illustrating an example interplay between a focusing sensor 30 and an imaging sensor 20 during scanning, according to an embodiment. In the illustrated embodiment, the timing of a scan using an imaging sensor 30 and focusing sensor 20 is shown. At time $t_0$, the Z position of the objective lens is at height $Z_0$ on tissue section $X_1$, which is in the field of view of the focusing sensor 30. The focusing sensor 30 receives focusing data corresponding to tissue section $X_1$. The focus height $Z_1$ is determined to be the optimal focus height for tissue section $X_1$ using the focusing data and, in some embodiments, associated focusing algorithms. The optimal focus height is then fed to the Z positioner to move the objective lens to the height $Z_1$, for example, using a control loop. At $t_1$, tissue section $X_1$ is moved into the field of view of the imaging sensor 20. With the correct focus height, the imaging sensor 20 will sense an optimally focused image of the sample. At the same time $t_1$, the focusing sensor 30 captures focusing data from tissue section $X_2$, and the focusing data will be used to determine the optimal focus height $Z_2$ which in turn will be fed into the Z positioner prior to or at the time that tissue section $X_2$ passes into the field of view of the imaging sensor 20 at time $t_2$. Such a process can continue until the entire tissue sample is scanned.

In general at time $t_n$, tissue section $X_{n+1}$ is in the field of view of the focusing sensor, tissue section $X_n$ is in the field of view of the imaging sensor 30, and the objective lens is at a Z height of $Z_n$. Furthermore, prior to or at the time $t_{n+1}$, the optimal focus height for tissue section $X_{n+1}$ is determined and the Z height of the objective lens is adjusted to $Z_{n+1}$. Considering FIG. 2, at time $t_0$, the focusing sensor 30 "sees" tissue section $X_1$ and determines the focus height as $Z_1$ for tissue section $X_1$; at time $t_1$, tissue section $X_1$ moves under the imaging sensor 20 and the objective moves to height $Z_1$ while the focusing sensor 30 "sees" tissue section $X_2$ and determines the focus height as $Z_2$ for tissue section $X_2$; at time $t_n$, tissue section $X_n$ moves under the imaging sensor 20 and the objective moves to height $Z_n$ while the focusing sensor 30 "sees" tissue section $X_{n+1}$ and determines the focus height as $Z_{n+1}$ for tissue section $X_{n+1}$. A person of skill in the art should understand that $X_{n-1}$ and $X_n$ do not necessarily represent consecutive or adjacent lines of image data, as long as a scan line is acquired by the focusing sensor 30 and an optimal focus height for the scan line is determined and set prior to the same scan line being acquired by the imaging sensor 20. In other words, the focusing sensor 30 and imaging sensor 20 may be arranged such that one or more scan lines exist between the focusing sensor's 30 field of view and the imaging sensor's 20 field of view, i.e., that distance h between the focusing sensor 30 and imaging sensor 20 comprises one or more scan lines of data. For instance, in that case that the distance h comprises 5 scan lines, tissue section $X_6$ would be in the field of view of the focusing sensor 30 at the same time that tissue section $X_1$ is in the field of view of the imaging sensor 20. In this case, the focus height of the objective lens would be adjusted to the calculated optimal focus height after the tissue section $X_5$ is sensed by the imaging sensor 20 but prior to the tissue section $X_6$ being sensed by the imaging sensor 20. Advantageously, the focus height of the objective lens may be smoothly controlled between tissue section $X_1$ and $X_6$ such that there are incremental changes in focus height between $X_1$ and $X_6$ that approximate a gradual slope of the tissue sample.

Figure 6:
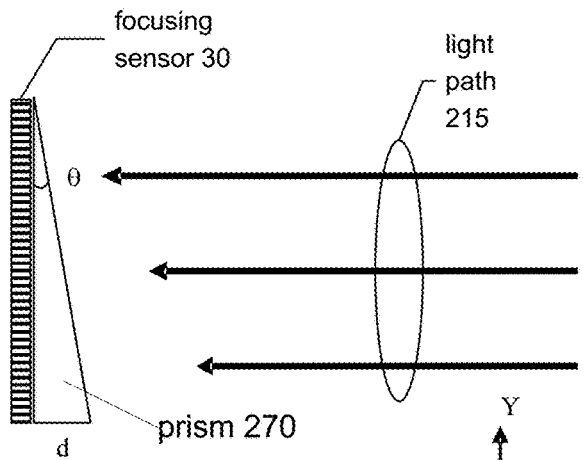
FIG. 6 is a block diagram illustrating an example non-tilted focusing sensor with a prism, according to an embodiment.

FIG. 6 is a block diagram illustrating an example non-tilted focusing sensor 30 with a prism 270, according to an embodiment. In the illustrated embodiment, FIG. 6 shows an alternative to the tilted focusing line sensor 30. Instead of tilting the focusing sensor 30, a wedge prism 270 attached to the focusing sensor 30 can be used to perform a similar focusing function. Alternatively, a combination of a wedge prism 270 and a tilted focusing sensor 30 could be employed. The algorithms and procedure may remain the same in such an alternative embodiment. Furthermore, if two parallel linear sensor arrays with sufficient spacing between the sensors can be integrated into a single field of view, a wedge prism 270 can be attached onto the focusing sensor 30 for focusing and the imaging sensor 20 can be used for sensing image data from the sample.

FIGS. 7A and 7B are block diagrams illustrating an example dual imaging and focusing sensor with a moveable prism, according to an embodiment. Advantageously, in this embodiment the same physical sensor can be used as both the focusing sensor 30 and the imaging sensor 20. As shown in FIG. 7A, when the wedge prism 270 is in place, the sensor performs the functions of the focusing sensor 30. The wedge prism 270 is in place when the wedge prism 270 is placed within the field of view of at least a portion of the sensor. Correspondingly, when the wedge prism 270 is not in place, the sensor performs the functions of the imaging sensor 20.

The wedge prism 270 is not in place when no portion of the wedge prism 270 is within the field of view of the sensor.

Such an embodiment can be used in connection with a scanning motion such as the motion described with respect to FIG. 9 whereby the scanning system focuses during a first pass of the sample under the objective lens and then the scanning system images during a second pass of the same portion of the sample under the objective lens. During the first pass, the wedge prism 270 is in place and during the second pass, the wedge prism 270 is not in place.

FIG. 8 is a block diagram illustrating an example multiple focusing sensor configuration of a scanning system, according to an embodiment. In the illustrated embodiment, the scanning system employs at least two focusing sensors 30 and 35. In the illustrated embodiment, the second focusing sensor 35 may comprise a linear sensory array tilted in the opposite direction as the first focusing sensor 30. The second focusing sensor 35 can perform the same focusing function as the first focusing sensor 30 to allow the scanning system to analyze data obtained from the two focusing sensors 30 and 35 and calculate a more precise optimal focus height for the objective lens when the imaging sensor passes over the specimen. For example, the scanning system may use the dual focusing sensor 30 35 data for averaging or compensation. The second focusing sensor 35 may be the third linear sensor array of the scanning system, when combined with the first focusing sensor 30 and the primary imaging sensor 20.

Figure 10:
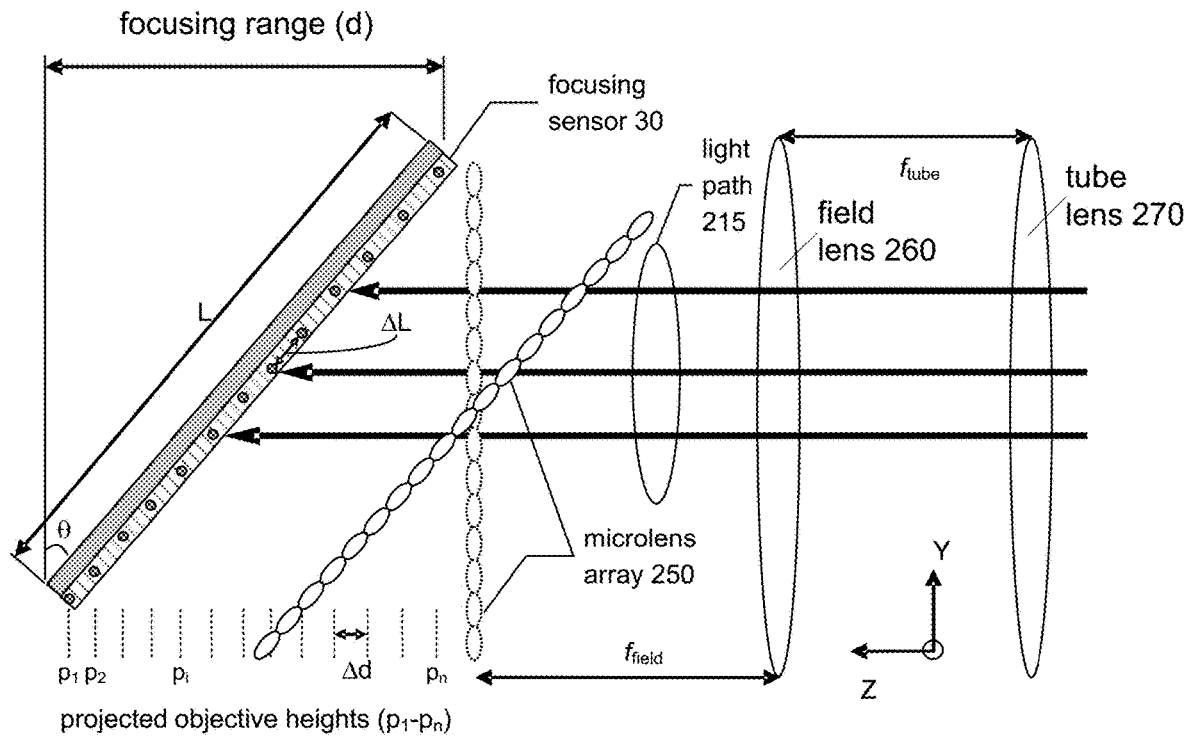
FIG. 10 is a block diagram illustrating an example focusing sensor with a microlens array, according to an embodiment.

FIG. 10 is a block diagram illustrating an example focusing sensor 30 with a microlens array 250, according to an embodiment. In the illustrated embodiment, a linear microlens array 250 (tilted or non-tilted) is positioned in the FOV of the tilted focusing sensor 30 (e.g., a linear sensor array) to have multiple micro images of an identical tissue section. This embodiment can be used to avoid possible ambiguity associated with partial tissue within the FOV, which may result from previously described embodiments and methods. In one embodiment, the minimum dimension of the microlens array 250 is to cover the cross-section of the light path falling onto the focusing sensor 30, whether the microlens array 250 is either tilted or not tilted. The number of microlens array 250 elements is determined by the Z resolution and the total focusing range. For instance, if a 0.5 □m resolution is required over a 20 □m focusing range, the number of lens elements is 40.

In one embodiment, the field lens 260 is used to reduce the vignetting effect in the scanning system and does not impact system magnification. In a microlens array 250 embodiment, the method to determine the best focus may be different than the figure of merit technique described above. For example, the scanning system may compare the average contrast, for example, among 40 microlens images with a 0.5 □m depth increment. The center location of the highest contrast in the image is found and the objective height is then determined based on the same formula as discussed above: $L_i = Z_i * M_{focusing}^2 / \sin \Box$.

Figure 11:
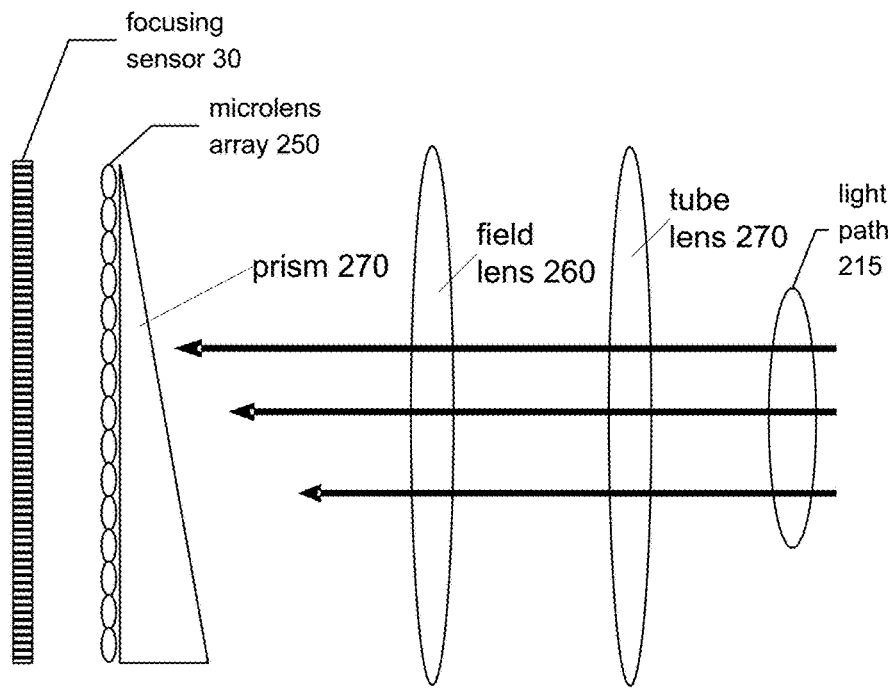
FIG. 11 is a block diagram illustrating an example non-tilted focusing sensor with a microlens array and a prism, according to an embodiment.

FIG. 11 is a block diagram illustrating an example non-tilted focusing sensor 30 with a microlens array 250 and a prism 270, according to an embodiment. In the illustrated embodiment, the microlens array 250 is integrated with a wedge prism 270 in front of the focusing sensor 30 (e.g., a line sensor) to perform the focusing function.

Figure 12A:
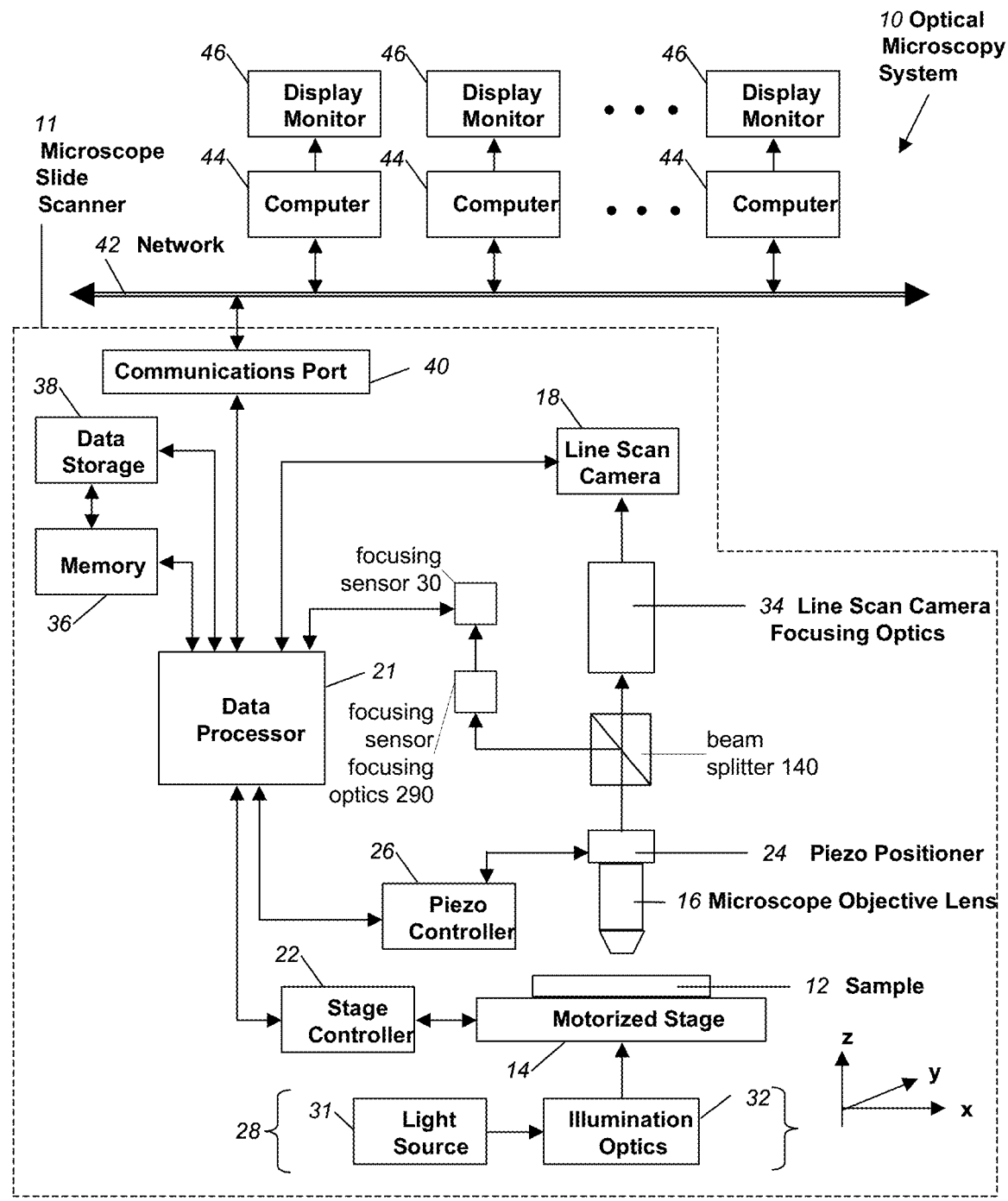
FIG. 12A is a block diagram illustrating an example microscope slide scanner, according to an embodiment.
Figure 12B:
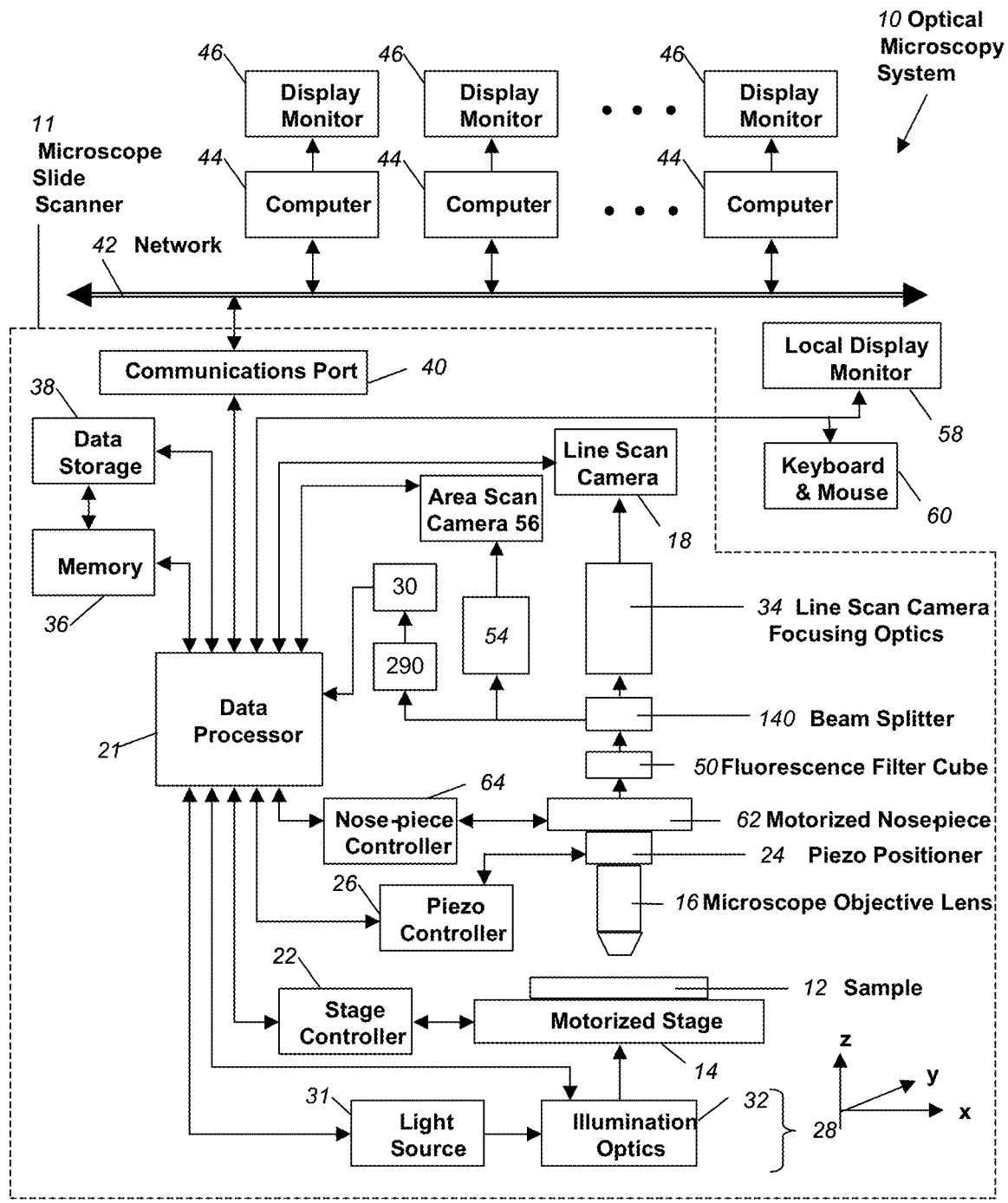
FIG. 12B is a block diagram illustrating an alternative example microscope slide scanner, according to an embodiment.
Figure 12C:
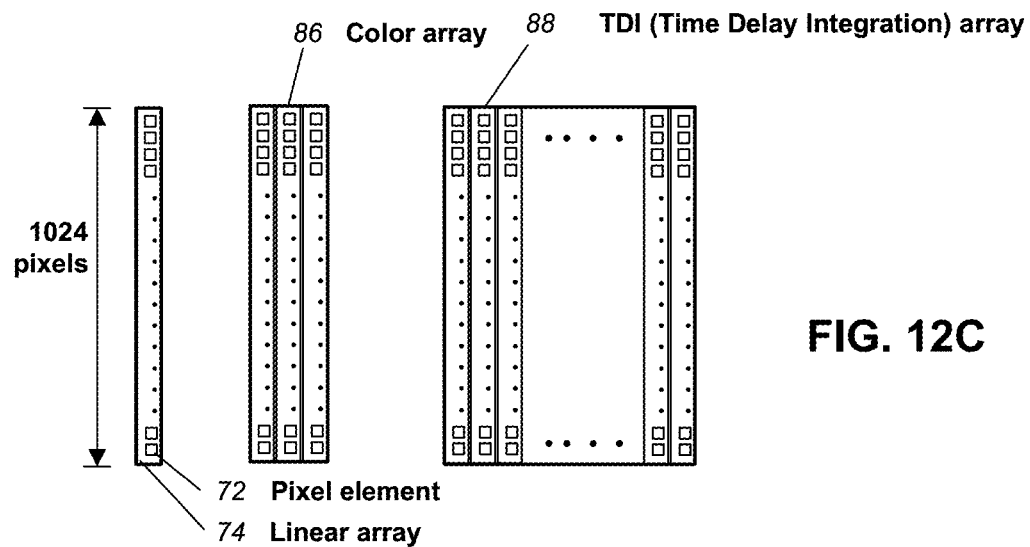
FIG. 12C is a block diagram illustrating example linear sensor arrays, according to an embodiment.

FIGS. 12A and 12B are block diagrams illustrating example microscope slide scanners, according to an embodiment and FIG. 12C is a block diagram illustrating example linear sensor arrays, according to an embodiment. These three figures will be described in more detail below, however they will first be described in combination to provide an overview. It should be noted that the following description is just an example of a slide scanner device and that alternative slide scanner devices can also be employed. FIGS. 12A and 12B illustrate example microscope slide scanners that can be used in conjunction with the disclosed sensor arrangement. FIG. 12C illustrates example linear sensors, which can be used in any combination as the disclosed sensors (imaging sensors or focusing sensors).

For example, the imaging sensor and the focusing sensor(s) may be arranged (e.g., in conjunction with a beam-splitter), as discussed above, using line scan camera 18 as the primary imaging sensor and focusing sensor 20 as the focusing sensor in combination with the beam splitter 140. In one embodiment, the line scan camera 18 may include both the focusing sensor and the primary imaging sensor. The imaging sensor and focusing sensor(s) can receive image information from a sample 12 through the microscope objective lens 16 and/or the focusing optics 34 and 290. Furthermore, they can provide information to, and/or receive information from, data processor 21. Data processor 21 is communicatively connected to memory 36 and data storage 38. Data processor 21 may further be communicatively connected to a communications port, which may be connected by at least one network 42 to one or more computers 44, which may in turn be connected to display monitor(s) 46.

Data processor 21 may also be communicatively connected to and provide instructions to a stage controller 22, which controls a motorized stage 14 of the slide scanner 11. The motorized stage 14 supports sample 12 and moves in one or more directions in the X-Y plane. In one embodiment, the motorized stage 14 may also move in the Z plane. Data processor 21 may also be communicatively connected to and provide instructions to a motorized controller 26, which controls a motorized positioner 24 (e.g., a piezo positioner). The motorized positioner 24 is configured to move the objective lens 16 in the Z direction. The slide scanner 11 also comprises a light source 31 and/or illumination optics 32 to illuminate the sample 12, either from above or below.

Turning now to FIG. 12A, a block diagram of an embodiment of an optical microscopy system 10 according to the present invention is shown. The heart of the system 10 is a microscope slide scanner 11 that serves to scan and digitize a specimen or sample 12. The sample 12 can be anything that may be interrogated by optical microscopy. For instance, the sample 12 may be a microscope slide or other sample type that may be interrogated by optical microscopy. A microscope slide is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 12 may also be an array of any type of DNA or DNA-related material such as cDNA or RNA or protein that is deposited on any type of slide or other substrate, including any and all samples commonly known as a microarrays. The sample 12 may be a microtiter plate, for example a 96-well plate. Other examples of the sample 12 include integrated circuit boards, electrophoresis records, petri dishes, film, semiconductor materials, forensic materials, or machined parts.

The scanner 11 includes a motorized stage 14, a microscope objective lens 16, a line scan camera 18, and a data processor 21. The sample 12 is positioned on the motorized stage 14 for scanning. The motorized stage 14 is connected to a stage controller 22 which is connected in turn to the data processor 21. The data processor 21 determines the position of the sample 12 on the motorized stage 14 via the stage controller 22. In one embodiment, the motorized stage 14 moves the sample 12 in at least the two axes (x/y) that are in the plane of the sample 12. Fine movements of the sample 12 along the optical z-axis may also be necessary for certain applications of the scanner 11, for example, for focus control. Z-axis movement is preferably accomplished with a piezo positioner 24, such as the PIFOC from Polytec PI or the MIPOS 3 from Piezosystem Jena. The piezo positioner 24 is attached directly to the microscope objective 16 and is connected to and directed by the data processor 21 via a piezo controller 26. A means of providing a coarse focus adjustment may also be needed and can be provided by z-axis movement as part of the motorized stage 14 or a manual rack-and-pinion coarse focus adjustment (not shown).

In one embodiment, the motorized stage 14 includes a high precision positioning table with ball bearing linear ways to provide smooth motion and excellent straight line and flatness accuracy. For example, the motorized stage 14 could include two Daedal model 106004 tables stacked one on top of the other. Other types of motorized stages 14 are also suitable for the scanner 11, including stacked single axis stages based on ways other than ball bearings, single- or multiple-axis positioning stages that are open in the center and are particularly suitable for trans-illumination from below the sample, or larger stages that can support a plurality of samples. In one embodiment, motorized stage 14 includes two stacked single-axis positioning tables, each coupled to two millimeter lead-screws and Nema-23 stepping motors. At the maximum lead screw speed of twenty-five revolutions per second, the maximum speed of the sample 12 on the motorized stage 14 is fifty millimeters per second. Selection of a lead screw with larger diameter, for example five millimeters, can increase the maximum speed to more than 100 millimeters per second. The motorized stage 14 can be equipped with mechanical or optical position encoders which has the disadvantage of adding significant expense to the system. Consequently, such an embodiment does not include position encoders. However, if one were to use servo motors in place of stepping motors, then one would have to use position feedback for proper control.

Position commands from the data processor 21 are converted to motor current or voltage commands in the stage controller 22. In one embodiment, the stage controller 22 includes a 2-axis servo/stepper motor controller (Compumotor 6K2) and two 4-amp microstepping drives (Compumotor OEMZL4). Microstepping provides a means for commanding the stepper motor in much smaller increments than the relatively large single 1.8 degree motor step. For example, at a microstep of 100, the sample 12 can be commanded to move at steps as small as 0.1 micrometer. A microstep of 25,000 is used in one embodiment of this invention. Smaller step sizes are also possible. It should be obvious that the optimum selection of the motorized stage 14 and the stage controller 22 depends on many factors, including the nature of the sample 12, the desired time for sample digitization, and the desired resolution of the resulting digital image of the sample 12.

The microscope objective lens 16 can be any microscope objective lens commonly available. One of ordinary skill in the art will realize that the choice of which objective lens to use will depend on the particular circumstances. In one embodiment of the present invention, the microscope objective lens 16 is of the infinity-corrected type.

The sample 12 is illuminated by an illumination system 28 that includes a light source 31 and illumination optics 32.

The light source 31 in one embodiment includes a variable intensity halogen light source with a concave reflective mirror to maximize light output and a KG-1 filter to suppress heat. However, the light source 31 could also be any other type of arc-lamp, laser, light emitting diode ("LED") or other source of light. The illumination optics 32 in one embodiment include a standard Kohler illumination system with two conjugate planes that are orthogonal to the optical axis. The illumination optics 32 are representative of the bright-field illumination optics that can be found on most commercially available compound microscopes sold by companies such as Carl Zeiss, Nikon, Olympus, or Leica. One set of conjugate planes includes (i) a field iris aperture illuminated by the light source 31, (ii) the object plane that is defined by the focal plane of the sample 12, and (iii) the plane containing the light-responsive elements of the line scan camera 18. A second conjugate plane includes (i) the filament of the bulb that is part of the light source 31, (ii) the aperture of a condenser iris that sits immediately before the condenser optics that are part of the illumination optics 32, and (iii) the back focal plane of the microscope objective lens 16. In one embodiment, the sample 12 is illuminated and imaged in transmission mode, with the line scan camera 18 sensing optical energy that is transmitted by the sample 12, or conversely, optical energy that is absorbed by the sample 12.

The scanner 11 of the present invention is equally suitable for detecting optical energy that is reflected from the sample 12, in which case the light source 31, the illumination optics 32, and the microscope objective lens 16 must be selected based on compatibility with reflection imaging. One possible embodiment may therefore be illumination through a fiber optic bundle that is positioned above the sample 12. Other possibilities include excitation that is spectrally conditioned by a monochromator. If the microscope objective lens 16 is selected to be compatible with phase-contrast microscopy, then the incorporation of at least one phase stop in the condenser optics that are part of the illumination optics 32 will enable the scanner 11 to be used for phase contrast microscopy. To one of ordinary skill in the art, the modifications required for other types of microscopy such as differential interference contrast and confocal microscopy should be readily apparent. Overall, the scanner 11 is suitable, with appropriate but well-known modifications, for the interrogation of microscopic samples in any known mode of optical microscopy.

Between the microscope objective lens 16 and the line scan camera 18 are situated the line scan camera focusing optics 34 that focus the optical signal captured by the microscope objective lens 16 onto the light-responsive elements of the line scan camera 18. In a modern infinity-corrected microscope the focusing optics between the microscope objective lens and the eyepiece optics, or between the microscope objective lens and an external imaging port, consist of an optical element known as a tube lens that is part of a microscope's observation tube. Many times the tube lens consists of multiple optical elements to prevent the introduction of coma or astigmatism. One of the motivations for the relatively recent change from traditional finite tube length optics to infinity corrected optics was to increase the physical space in which the optical energy from the sample 12 is parallel, meaning that the focal point of this optical energy is at infinity. In this case, accessory elements like dichroic mirrors or filters can be inserted into the infinity space without changing the optical path magnification or introducing undesirable optical artifacts.

Infinity-corrected microscope objective lenses are typically inscribed with an infinity mark. The magnification of an infinity corrected microscope objective lens is given by the quotient of the focal length of the tube lens divided by the focal length of the objective lens. For example, a tube lens with a focal length of 180 millimeters will result in 20× magnification if an objective lens with 9 millimeter focal length is used. One of the reasons that the objective lenses manufactured by different microscope manufacturers are not compatible is because of a lack of standardization in the tube lens focal length. For example, a 20× objective lens from Olympus, a company that uses a 180 millimeter tube lens focal length, will not provide a 20× magnification on a Nikon microscope that is based on a different tube length focal length of 200 millimeters. Instead, the effective magnification of such an Olympus objective lens engraved with 20× and having a 9 millimeter focal length will be 22.2×, obtained by dividing the 200 millimeter tube lens focal length by the 9 millimeter focal length of the objective lens. Changing the tube lens on a conventional microscope is virtually impossible without disassembling the microscope. The tube lens is part of a critical fixed element of the microscope. Another contributing factor to the incompatibility between the objective lenses and microscopes manufactured by different manufacturers is the design of the eyepiece optics, the binoculars through which the specimen is observed. While most of the optical corrections have been designed into the microscope objective lens, most microscope users remain convinced that there is some benefit in matching one manufacturers' binocular optics with that same manufacturers' microscope objective lenses to achieve the best visual image.

The line scan camera focusing optics 34 include a tube lens optic mounted inside of a mechanical tube. Since the scanner 11, in one embodiment, lacks binoculars or eyepieces for traditional visual observation, the problem suffered by conventional microscopes of potential incompatibility between objective lenses and binoculars is immediately eliminated. One of ordinary skill will similarly realize that the problem of achieving parfocality between the eyepieces of the microscope and a digital image on a display monitor is also eliminated by virtue of not having any eyepieces. Since the scanner 11 also overcomes the field of view limitation of a traditional microscope by providing a field of view that is practically limited only by the physical boundaries of the sample 12, the importance of magnification in an all-digital imaging microscope such as provided by the present scanner 11 is limited. Once a portion of the sample 12 has been digitized, it is straightforward to apply electronic magnification, sometimes known as electric zoom, to an image of the sample 12 in order to increase its magnification. Increasing the magnification of an image electronically has the effect of increasing the size of that image on the monitor that is used to display the image. If too much electronic zoom is applied, then the display monitor will be able to show only portions of the magnified image. It is not possible, however, to use electronic magnification to display information that was not present in the original optical signal that was digitized in the first place. Since one of the objectives of the scanner 11 is to provide high quality digital images, in lieu of visual observation through the eyepieces of a microscope, it is important that the content of the images acquired by the scanner 11 include as much image detail as possible. The term resolution is typically used to describe such image detail and the term diffraction-limited is used to describe the wavelength-limited maximum spatial detail available in an optical signal. The scanner 11 provides diffraction-limited digital imaging by selection of a tube lens focal length that is matched according to the well know Nyquist sampling criteria to both the size of an individual pixel element in a light-sensing camera such as the line scan camera 18 and to the numerical aperture of the microscope objective lens 16. It is well known that numerical aperture, not magnification, is the resolution-limiting attribute of a microscope objective lens 16.

An example will help to illustrate the optimum selection of a tube lens focal length that is part of the line scan camera focusing optics 34. Consider again the 20× microscope objective lens 16 with 9 millimeter focal length discussed previously and assume that this objective lens has a numerical aperture of 0.50. Assuming no appreciable degradation from the condenser, the diffraction-limited resolving power of this objective lens at a wavelength of 500 nanometers is approximately 0.6 micrometers, obtained using the well-known Abbe relationship. Assume further that the line scan camera 18, which in one embodiment has a plurality of 14 micrometer square pixels, is used to detect a portion of the sample 12. In accordance with sampling theory, it is necessary that at least two sensor pixels subtend the smallest resolvable spatial feature. In this case, the tube lens must be selected to achieve a magnification of 46.7, obtained by dividing 28 micrometers, which corresponds to two 14 micrometer pixels, by 0.6 micrometers, the smallest resolvable feature dimension. The optimum tube lens optic focal length is therefore about 420 millimeters, obtained by multiplying 46.7 by 9. The line scan focusing optics 34 with a tube lens optic having a focal length of 420 millimeters will therefore be capable of acquiring images with the best possible spatial resolution, similar to what would be observed by viewing a specimen under a microscope using the same 20× objective lens. To reiterate, the scanner 11 utilizes a traditional 20× microscope objective lens 16 in a higher magnification optical configuration, in this example about 47×, in order to acquire diffraction-limited digital images. If a traditional 20× magnification objective lens 16 with a higher numerical aperture were used, say 0.75, the required tube lens optic magnification for diffraction-limited imaging would be about 615 millimeters, corresponding to an overall optical magnification of 68×. Similarly, if the numerical aperture of the 20× objective lens were only 0.3, the optimum tube lens optic magnification would only be about 28×, which corresponds to a tube lens optic focal length of approximately 252 millimeters. The line scan camera focusing optics 34 are modular elements of the scanner 11 and can be interchanged as necessary for optimum digital imaging. The advantage of diffraction-limited digital imaging is particularly significant for applications, for example bright field microscopy, in which the reduction in signal brightness that accompanies increases in magnification is readily compensated by increasing the intensity of an appropriately designed illumination system 28.

In principle, it is possible to attach external magnification-increasing optics to a conventional microscope-based digital imaging system to effectively increase the tube lens magnification so as to achieve diffraction-limited imaging as has just been described for the present scanner 11; however, the resulting decrease in the field of view is often unacceptable, making this approach impractical. Furthermore, many users of microscopes typically do not understand enough about the details of diffraction-limited imaging to effectively employ these techniques on their own. In practice, digital cameras are attached to microscope ports with magnification-decreasing optical couplers to attempt to increase the size of the field of view to something more similar to what can be seen through the eyepiece. The standard practice of adding de-magnifying optics is a step in the wrong direction if the goal is to obtain diffraction-limited digital images.

In a conventional microscope, different power objectives lenses are typically used to view the specimen at different resolutions and magnifications. Standard microscopes have a nosepiece that holds five objectives lenses. In an all-digital imaging system such as the present scanner 11 there is a need for only one microscope objective lens 16 with a numerical aperture corresponding to the highest spatial resolution desirable. One embodiment of the scanner 11 provides for only one microscope objective lens 16. Once a diffraction-limited digital image has been captured at this resolution, it is straightforward using standard digital image processing techniques, to present imagery information at any desirable reduced resolutions and magnifications.

One embodiment of the scanner 11 is based on a Dalsa SPARK line scan camera 18 with 1024 pixels (picture elements) arranged in a linear array, with each pixel having a dimension of 14 by 14 micrometers. Any other type of linear array, whether packaged as part of a camera or custom-integrated into an imaging electronic module, can also be used. The linear array in one embodiment effectively provides eight bits of quantization, but other arrays providing higher or lower level of quantization may also be used. Alternate arrays based on 3-channel red-green-blue (RGB) color information or time delay integration (TDI), may also be used. TDI arrays provide a substantially better signal-to-noise ratio (SNR) in the output signal by summing intensity data from previously imaged regions of a specimen, yielding an increase in the SNR that is in proportion to the square-root of the number of integration stages. TDI arrays can comprise multiple stages of linear arrays. TDI arrays are available with 24, 32, 48, 64, 96, or even more stages. The scanner 11 also supports linear arrays that are manufactured in a variety of formats including some with 512 pixels, some with 1024 pixels, and others having as many as 4096 pixels. Appropriate, but well known, modifications to the illumination system 28 and the line scan camera focusing optics 34 may be required to accommodate larger arrays. Linear arrays with a variety of pixel sizes can also be used in scanner 11. The salient requirement for the selection of any type of line scan camera 18 is that the sample 12 can be in motion with respect to the line scan camera 18 during the digitization of the sample 12 in order to obtain high quality images, overcoming the static requirements of the conventional imaging tiling approaches known in the prior art.

The output signal of the line scan camera 18 is connected to the data processor 21. The data processor 21 in one embodiment includes a central processing unit with ancillary electronics, for example a motherboard, to support at least one signal digitizing electronics board such as an imaging board or a frame grabber. In the presently embodiment, the imaging board is an EPIX PIXCID24 PCI bus imaging board, however, there are many other types of imaging boards or frame grabbers from a variety of manufacturers which could be used in place of the EPIX board. An alternate embodiment could be a line scan camera that uses an interface such as IEEE 1394, also known as Firewire, to bypass the imaging board altogether and store data directly on a data storage 38, such as a hard disk.

The data processor 21 is also connected to a memory 36, such as random access memory (RAM), for the short-term storage of data, and to the data storage 38, such as a hard drive, for long-term data storage. Further, the data processor 21 is connected to a communications port 40 that is connected to a network 42 such as a local area network (LAN), a wide area network (WAN), a metropolitan area network (MAN), an intranet, an extranet, or the global Internet. The memory 36 and the data storage 38 are also connected to each other. The data processor 21 is also capable of executing computer programs, in the form of software, to control critical elements of the scanner 11 such as the line scan camera 18 and the stage controller 22, or for a variety of image-processing functions, image-analysis functions, or networking. The data processor 21 can be based on any operating system, including operating systems such as Windows, Linux, OS/2, Mac OS, and Unix. In one embodiment, the data processor 21 operates based on the Windows NT operating system.

The data processor 21, memory 36, data storage 38, and communication port 40 are each elements that can be found in a conventional computer. One example would be a personal computer such as a Dell Dimension XPS T500 that features a Pentium III 500 MHz processor and up to 756 megabytes (MB) of RAM. In one embodiment, the computer, elements which include the data processor 21, memory 36, data storage 38, and communications port 40 are all internal to the scanner 11, so that the only connection of the scanner 11 to the other elements of the system 10 is the communication port 40. In an alternate embodiment of the scanner 11, the computer elements would be external to the scanner 11 with a corresponding connection between the computer elements and the scanner 11.

The scanner 11, in one embodiment of the invention, integrates optical microscopy, digital imaging, motorized sample positioning, computing, and network-based communications into a single-enclosure unit. The major advantage of packaging the scanner 11 as a single-enclosure unit with the communications port 40 as the primary means of data input and output are reduced complexity and increased reliability. The various elements of the scanner 11 are optimized to work together, in sharp contrast to traditional microscope-based imaging systems in which the microscope, light source, motorized stage, camera, and computer are typically provided by different vendors and require substantial integration and maintenance.

The communication port 40 provides a means for rapid communications with the other elements of the system 10, including the network 42. One communications protocol for the communications port 40 is a carrier-sense multiple-access collision detection protocol such as Ethernet, together with the TCP/IP protocol for transmission control and internetworking. The scanner 11 is intended to work with any type of transmission media, including broadband, baseband, coaxial cable, twisted pair, fiber optics, DSL or wireless.

In one embodiment, control of the scanner 11 and review of the imagery data captured by the scanner 11 are performed on a computer 44 that is connected to the network 42. The computer 44, in one embodiment, is connected to a display monitor 46 to provide imagery information to an operator. A plurality of computers 44 may be connected to the network 42. In one embodiment, the computer 44 communicates with the scanner 11 using a network browser such as Internet Explorer from Microsoft or Netscape Communicator from AOL. Images are stored on the scanner 11 in a common compressed format such a JPEG which is an image format that is compatible with standard image-decompression methods that are already built into most commercial browsers. Other standard or non-standard, lossy or lossless, image compression formats will also work. In one embodiment, the scanner 11 is a webserver providing an operator interface that is based on webpages that are sent from the scanner 11 to the computer 44. For dynamic review of imagery data, one embodiment of the scanner 11 is based on playing back, for review on the display monitor 46 that is connected to the computer 44, multiple frames of imagery data using standard multiple-frame browser compatible software packages such as Media-Player from Microsoft, Quicktime from Apple Computer, or RealPlayer from Real Networks. In one embodiment, the browser on the computer 44 uses the hypertext transmission protocol (http) together with TCP for transmission control.

There are, and will be in the future, many different means and protocols by which the scanner 11 could communicate with the computer 44, or a plurality of computers. While one embodiment is based on standard means and protocols, the approach of developing one or multiple customized software modules known as applets is equally feasible and may be desirable for selected future applications of the scanner 11. Further, there are no constraints that computer 44 be of any specific type such as a personal computer (PC) or be manufactured by any specific company such as Dell. One of the advantages of a standardized communications port 40 is that any type of computer 44 operating common network browser software can communicate with the scanner 11.

If one so desires, it is possible, with some modifications to the scanner 11, to obtain spectrally resolved images. Spectrally resolved images are images in which spectral information is measured at every image pixel. Spectrally resolved images could be obtained by replacing the line scan camera 18 of the scanner 11 with an optical slit and an imaging spectrograph. The imaging spectrograph uses a two-dimensional CCD detector to capture wavelength-specific intensity data for a column of image pixels by using a prism or grating to disperse the optical signal that is focused on the optical slit along each of the rows of the detector.

Turning now to FIG. 12B, a block diagram of a second embodiment of an optical microscopy system 10 according to the present invention is shown. In this system 10, the scanner 11 is more complex and expensive than the embodiment shown in FIG. 12A. The additional attributes of the scanner 11 that are shown do not all have to be present for any alternate embodiment to function correctly. FIG. 2 is intended to provide a reasonable example of additional features and capabilities that could be incorporated into the scanner 11.

The alternate embodiment of FIG. 12B provides for a much greater level of automation than the embodiment of FIG. 12A. A more complete level of automation of the illumination system 28 is achieved by connections between the data processor 21 and both the light source 31 and the illumination optics 32 of the illumination system 28. The connection to the light source 31 may control the voltage, or current, in an open or closed loop fashion, in order to control the intensity of the light source 31. Recall that the light source 31 is a halogen bulb in one embodiment. The connection between the data processor 21 and the illumination optics 32 could provide closed loop control of the field iris aperture and the condenser iris to provide a means for ensuring that optimum Kohler illumination is maintained.

Use of the scanner 11 for fluorescence imaging requires easily recognized modifications to the light source 31, the illumination optics 32, and the microscope objective lens 16. The second embodiment of FIG. 12B also provides for a fluorescence filter cube 50 that includes an excitation filter, a dichroic filter, and a barrier filter. The fluorescence filter cube 50 is positioned in the infinity corrected beam path that exists between the microscope objective lens 16 and line scan camera focusing optics 34. One embodiment for fluorescence imaging could include the addition of a filter wheel or tunable filter into the illumination optics 32 to provide appropriate spectral excitation for the variety of fluorescent dyes or nano-crystals available on the market.

The addition of at least one beam splitter 52 into the imaging path allows the optical signal to be split into at least two paths. The primary path is via the line scan camera focusing optics 34, as discussed previously, to enable diffraction-limited imaging by the line scan camera 18. A second path is provided via an area scan camera focusing optics 54 for imaging by an area scan camera 56. It should be readily apparent that proper selection of these two focusing optics can ensure diffraction-limited imaging by the two camera sensors having different pixel sizes. The area scan camera 56 can be one of many types that are currently available, including a simple color video camera, a high performance, cooled, CCD camera, or a variable integration-time fast frame camera. The area scan camera 56 provides a traditional imaging system configuration for the scanner 11. The area scan camera 56 is connected to the data processor 21. If two cameras are used, for example the line scan camera 18 and the area scan camera 56, both camera types could be connected to the data processor using either a single dual-purpose imaging board, two different imaging boards, or the IEEE1394 Firewire interface, in which case one or both imaging boards may not be needed. Other related methods of interfacing imaging sensors to the data processor 21 are also available.

While the primary interface of the scanner 11 to the computer 44 is via the network 42, there may be instances, for example a failure of the network 42, where it is beneficial to be able to connect the scanner 11 directly to a local output device such as a display monitor 58 and to also provide local input devices such as a keyboard and mouse 60 that are connected directly into the data processor 21 of the scanner 11. In this instance, the appropriate driver software and hardware would have to be provided as well.

The second embodiment shown in FIG. 12B also provides for a much greater level of automated imaging performance. Enhanced automation of the imaging of the scanner 11 can be achieved by closing the focus control loop comprising the piezo positioner 24, the piezo controller 26, and the data processor 21 using well-known methods of autofocus. The second embodiment also provides for a motorized nose-piece 62 to accommodate several objectives lenses. The motorized nose-piece 62 is connected to and directed by the data processor 21 through a nose-piece controller 64.

There are other features and capabilities of the scanner 11 which could be incorporated. For example, the process of scanning the sample 12 with respect to the microscope objective lens 16 that is substantially stationary in the x/y plane of the sample 12 could be modified to comprise scanning of the microscope objective lens 16 with respect to a stationary sample 12. Scanning the sample 12, or scanning the microscope objective lens 16, or scanning both the sample 12 and the microscope objective lens 16 simultaneously, are possible embodiments of the scanner 11 which can provide the same large contiguous digital image of the sample 12 as discussed previously.

The scanner 11 also provides a general purpose platform for automating many types of microscope-based analyses. The illumination system 28 could be modified from a traditional halogen lamp or arc-lamp to a laser-based illumination system to permit scanning of the sample 12 with laser excitation. Modifications, including the incorporation of a photomultiplier tube or other non-imaging detector, in addition to or in lieu of the line scan camera 18 or the area scan camera 56, could be used to provide a means of detecting the optical signal resulting from the interaction of the laser energy with the sample 12.

Turning now to FIG. 12C, the line scan camera field of view 70 comprises the region of the sample 12 of FIG. 12A that is imaged by a multitude of individual pixel elements 72 that are arranged in a linear fashion into a linear array 74 as shown in FIG. 12C. The linear array 74 of one embodiment comprises 1024 of the individual pixel elements 72, with each of the pixel elements 72 being 14 micrometers square. The physical dimensions of the linear array 74 of one embodiment are 14.34 millimeters by 14 micrometers. Assuming, for purposes of discussion of the operation of the scanner 11, that the magnification between the sample 12 and the line scan camera 18 is ten, then the line scan camera field of view 70 corresponds to a region of the sample 12 that has dimensions equal to 1.43 millimeters by 1.4 micrometers. Each pixel element 72 images an area about 1.4 micrometers by 1.4 micrometers.

In one embodiment of the scanner 11, the scanning and digitization is performed in a direction of travel 84 that alternates between image strips. This type of bi-directional scanning provides for a more rapid digitization process than uni-directional scanning, a method of scanning and digitization which requires the same direction of travel 84 for each image strip.

The capabilities of the line scan camera 18 and the focusing sensor 30 typically determine whether scanning and focusing can be done bi-directionally or uni-directionally. Uni-directional systems often comprise more than one linear array 74, such as a three channel color array 86 or a multi-channel TDI array 88 shown in FIG. 12C. The color array 86 detects the RGB intensities required for obtaining a color image. An alternate embodiment for obtaining color information uses a prism to split the broadband optical signal into the three color channels. The TDI array 88 could be used in an alternate embodiment of the scanner 11 to provide a means of increasing the effective integration time of the line scan camera 18, while maintaining a fast data rate, and without significant loss in the signal-to-noise ratio of the digital imagery data.

Figure 13:
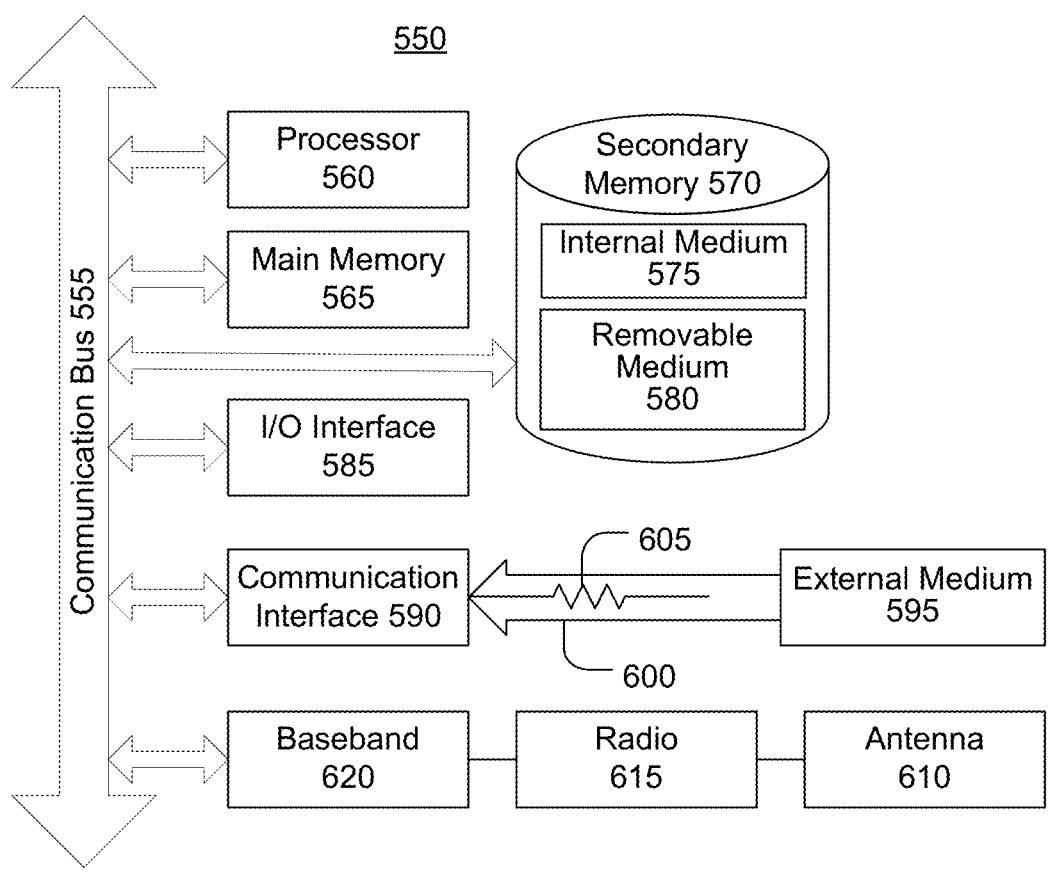
FIG. 13 is a block diagram illustrating an example wired or wireless processor-enabled device that may be used in connection with various embodiments described herein.

FIG. 13 is a block diagram illustrating an example wired or wireless processor-enabled device 550 that may be used in connection with various embodiments described herein. For example the system 550 may be used as or in conjunction with the line scanning system as previously described. For example, the system 550 can be used to control the various elements of the line scanning system. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths.

In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that were previously described.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described FIG.s and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for capturing a digital image of a slide, the system comprising:
   an objective lens having a single optical axis;
   a motorized positioner to control the objective lens;
   a stage configured to support a sample;
   at least one line sensor;
   a moveable wedge prism configured to move into and out of a field of view of the at least one line sensor; and
   at least one processor that controls the moveable wedge prism and one or more of the stage and the objective lens such that each portion of one or more images of the sample is received by the at least one line sensor, both while the moveable wedge prism is in the field of view and while the moveable wedge prism is not in the field of view.

2. The system of claim 1, wherein the stage is a motorized stage, and the at least one processor controls the motorized stage.

3. The system of claim 1, wherein the at least one processor further:
   receives a captured first portion of the one or more images from the at least one line sensor while the moveable wedge prism is in the field of view;
   determines a focus height for the captured first portion of the one or more images; and
   causes the objective lens to move to the focus height prior to the first portion of the one or more images being captured by the at least one line sensor while the moveable wedge prism is not in the field of view.

4. The system of claim 1, wherein the at least one line sensor comprises two or more line sensors.

5. The system of claim 1, wherein the at least one processor further aligns adjacent portions of the one or more images into a single digital image of at least a portion of the sample.

6. A method of capturing a digital image of a slide, the method comprising:
   by an objective lens having a single optical axis, acquiring one or more images of at least a portion of a sample supported on a stage;
   and
   by at least one processor, controlling a moveable wedge prism and one or more of the stage and the objective lens such that each portion of the one or more images is received by at least one line sensor, both while the moveable wedge prism is in a field of view of the at least one line sensor and while the moveable wedge prism is not in the field of view.

* * * * *

UNITED STATES PATENT AND TRADEMARK OFFICE
CERTIFICATE OF CORRECTION

PATENT NO. : 10,852,521 B2
APPLICATION NO. : 16/224397
DATED : December 1, 2020
INVENTOR(S) : Zou et al.

It is certified that error appears in the above-identified patent and that said Letters Patent is hereby corrected as shown below:

In the Specification

Column 5, Line 3, delete "where □ is" and insert -- where κ is --.

Column 5, Line 57, delete "(e.g., 20 □m)" and insert -- (e.g., 20 μm) --.

Column 6, Line 8, delete "z=20 □m" and insert -- z=20 μm --.

Column 6, Line 12, delete "angle □" and insert -- angle θ --.

Column 6, Line 13, delete "sin □=d/L" and insert -- sin θ=d/L --.

Column 6, Line 14, delete "□=23.0°." and insert -- θ=23.0°. --.

Column 6, Line 14, delete "□□ and L" and insert -- θ and L --.

Column 6, Line 18, delete "□z" and insert -- Δz --.

Column 6, Line 19, delete "e=minimum(□L)." and insert -- e=minimum (ΔL). --.

Column 6, Line 21, delete "□z=e*z/L." and insert -- Δz=e*z/L. --.

Column 6, Line 22, delete "e=10 □m," and insert -- e=10 μm, --.

Column 6, Line 22, delete "z=20 □m," and insert -- z=20 μm, --.

Column 6, Line 23, delete "□z=0.0097" and insert -- Δz=0.0097 --.

Column 6, Line 23, delete "□m<10 nm." and insert -- μm <10 nm. --.

Signed and Sealed this
Fourteenth Day of June, 2022

*Katherine Kelly Vidal*

Katherine Kelly Vidal
*Director of the United States Patent and Trademark Office*

CERTIFICATE OF CORRECTION (continued)
U.S. Pat. No. 10,852,521 B2

Column 6, Line 33, delete "$L_i = Z_i * M_{focusing}^2 / \sin \square$" and insert -- $L_i = Z_i * M_{focusing}^2 / \sin \theta$ --.

Column 6, Line 39, delete "$Z_2 = Z_1 + (L_2 - L_1) * \sin \square / M_{focusing}^2$" and insert
-- $Z_2 = Z_1 + (L_2 - L_1) * \sin \theta / M_{focusing}^2$ --.

Column 8, Line 43, delete "0.5 $\square$m" and insert -- 0.5 μm --.

Column 8, Line 44, delete "20 $\square$m" and insert -- 20 μm --.

Column 8, Line 52, delete "0.5 $\square$m" and insert -- 0.5 μm --.

Column 8, Line 56, delete "$L_i - Z_i * M_{focusing}^2 / \sin \square$." and insert -- $L_i - Z_i * M_{focusing}^2 / \sin \theta$. --.